United States Patent
Lee et al.

(10) Patent No.: US 11,119,222 B2
(45) Date of Patent: Sep. 14, 2021

(54) METHOD AND SYSTEM FOR LOCAL-AREA DIFFERENTIAL GNSS FOR UAV NAVIGATION, AND FOR GENERATING OPTIMAL PROTECTION LEVEL AND GEOMETRY SCREENING THEREFOR

(71) Applicant: KOREA ADVANCED INSTITUTE OF SCIENCE AND TECHNOLOGY (KAIST), Daejeon (KR)

(72) Inventors: Jiyun Lee, Daejeon (KR); Jinsil Lee, Daejeon (KR); Min Chan Kim, Daejeon (KR); Dongwoo Kim, Daejeon (KR); Moon Seok Yoon, Daejeon (KR)

(73) Assignee: KOREA ADVANCED INSTITUTE OF SCIENCE AND TECHNOLOGY (KAIST), Daejeon (KR)

( * ) Notice: Subject to any disclaimer, the term of this patent is extended or adjusted under 35 U.S.C. 154(b) by 300 days.

(21) Appl. No.: 16/223,270

(22) Filed: Dec. 18, 2018

(65) Prior Publication Data
US 2019/0187295 A1 Jun. 20, 2019

(30) Foreign Application Priority Data

Dec. 18, 2017 (KR) .................. 10-2017-0174622
Dec. 18, 2017 (KR) .................. 10-2017-0174627
Dec. 18, 2017 (KR) .................. 10-2017-0174629

(51) Int. Cl.
*G01S 19/41* (2010.01)
*G01S 19/20* (2010.01)
(Continued)

(52) U.S. Cl.
CPC ............ *G01S 19/41* (2013.01); *G01S 19/071* (2019.08); *G01S 19/072* (2019.08);
(Continued)

(58) Field of Classification Search
CPC ........ G01S 19/07; G01S 19/072; G01S 19/20; G01S 19/21; G01S 19/40; G01S 19/41;
(Continued)

(56) References Cited

U.S. PATENT DOCUMENTS 8,902,105 B2 * 12/2014 Fernandez .............. G01S 19/20
342/357.58
10,295,674 B2 * 5/2019 Yun .......................... G01S 19/20
(Continued)

FOREIGN PATENT DOCUMENTS

EP          2461182 A1 *  6/2012  ............. G01S 19/20
EP          3023811 A1 *  5/2016  ............. G01S 19/40

*Primary Examiner* — Olumide Ajibade Akonai
(74) *Attorney, Agent, or Firm* — Lex IP Meister, PLLC

(57) ABSTRACT

The present invention relates to a system for improving accuracy and safety of UAV navigation, and for generating an optimal protection level and geometry screening, and more particularly to a system that monitors an error and a failure of a GNSS navigation signal, broadcasts error correction information and integrity information to a UAV within a radius of about 20 km to allow the UAV to apply the corresponding information by a ground module, thereby improving the navigation accuracy and safety of the UAV. The ground module receives a GNSS navigation signal, calculates GNSS navigation error information, and generates correction information, and monitors a failure through a simplified failure monitoring algorithm, and the mounted module provides a system and a method for receiving a message that is broadcast by the ground module, and calculating precise and safe navigation information of an UAV by applying the message.

5 Claims, 15 Drawing Sheets

(51) Int. Cl.
  *G01S 19/21* (2010.01)
  *G01S 19/08* (2010.01)
  *G01S 19/15* (2010.01)
  *G01S 19/07* (2010.01)
  *B64C 39/02* (2006.01)

(52) U.S. Cl.
  CPC ............ *G01S 19/074* (2019.08); *G01S 19/08* (2013.01); *G01S 19/15* (2013.01); *G01S 19/20* (2013.01); *G01S 19/21* (2013.01); *B64C 39/024* (2013.01); *B64C 2201/145* (2013.01)

(58) Field of Classification Search
  CPC ...... G01S 19/074; G01S 19/08; G01S 19/071; G01S 19/15; G01S 19/42; G01S 19/48; G01S 19/13; B64C 39/024; B64C 2201/145; B64C 2201/027; B64C 37/02; G05D 1/101; G08G 5/0069; G08G 1/005; G08G 9/02; G08G 5/0013; G08G 5/0021; H04W 4/02; B60W 2556/50; B60W 2050/0078
  See application file for complete search history.

(56) References Cited

U.S. PATENT DOCUMENTS

| | | | |
|---|---|---|---|
| 10,670,729 B2* | 6/2020 | de Groot | G01S 19/20 |
| 2009/0273515 A1* | 11/2009 | Azaola Saenz | G01S 19/42 |
| | | | 342/357.27 |
| 2012/0019411 A1* | 1/2012 | Trautenberg | G01S 19/41 |
| | | | 342/357.24 |
| 2016/0116595 A1* | 4/2016 | Scheitlin | G01S 19/071 |
| | | | 342/357.44 |
| 2016/0282470 A1* | 9/2016 | McDonald | G01S 19/05 |

* cited by examiner

[Fig. 1]
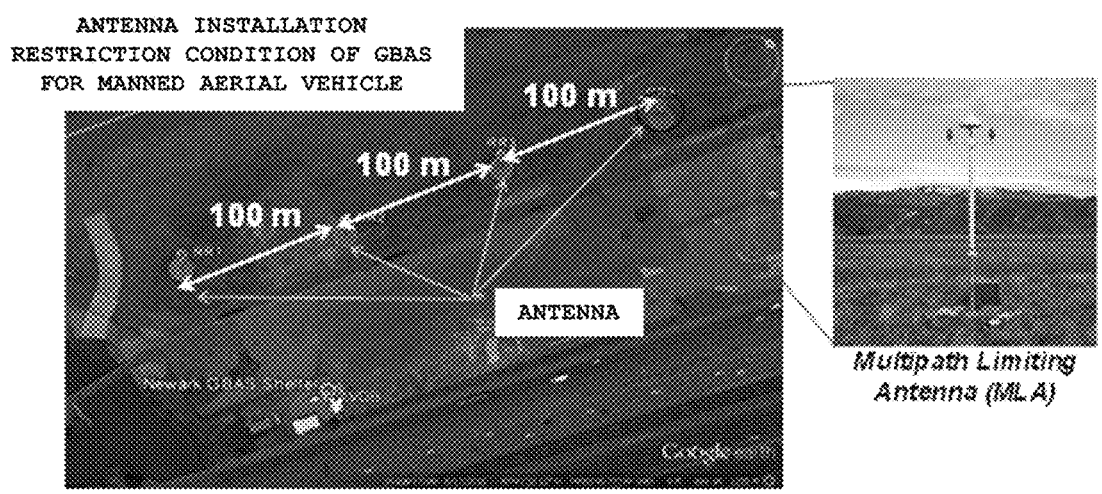

[Fig. 2]
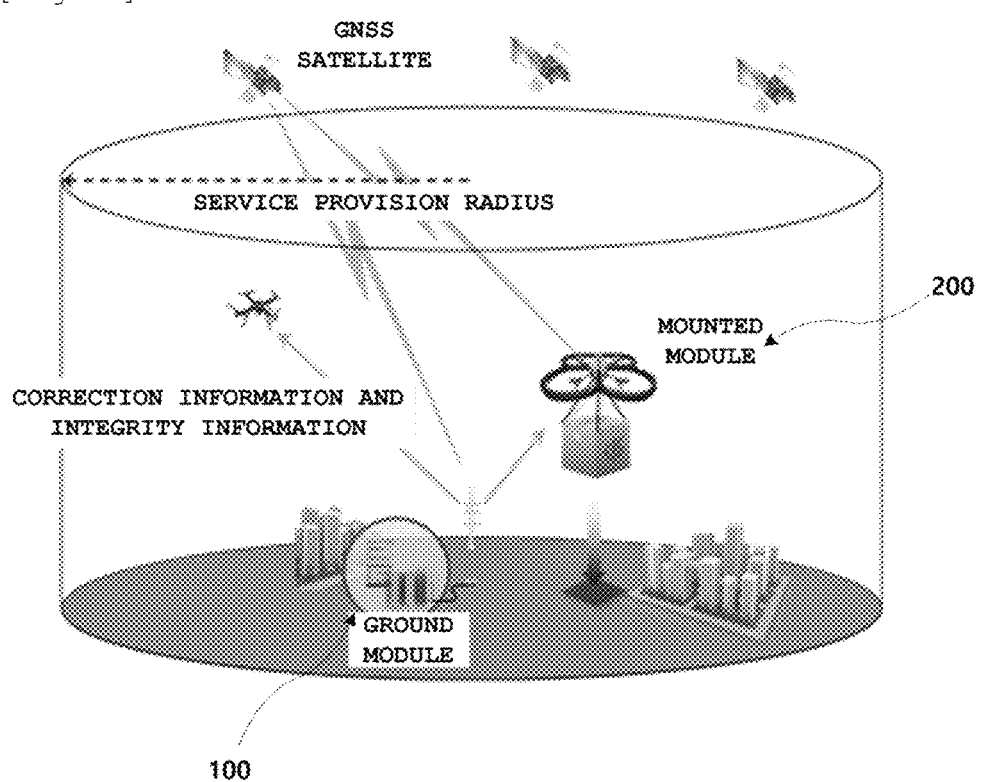

[Fig. 3]
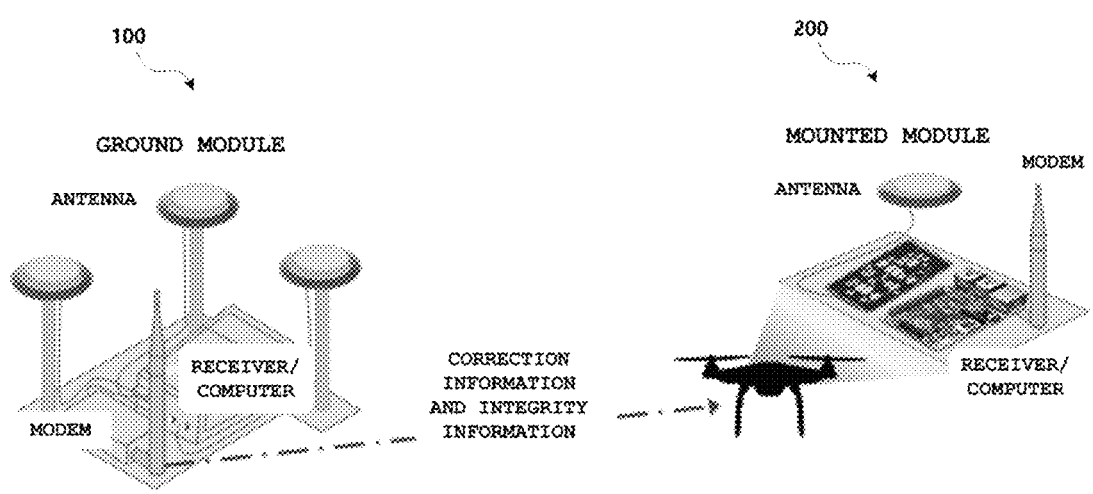

[Fig. 4]
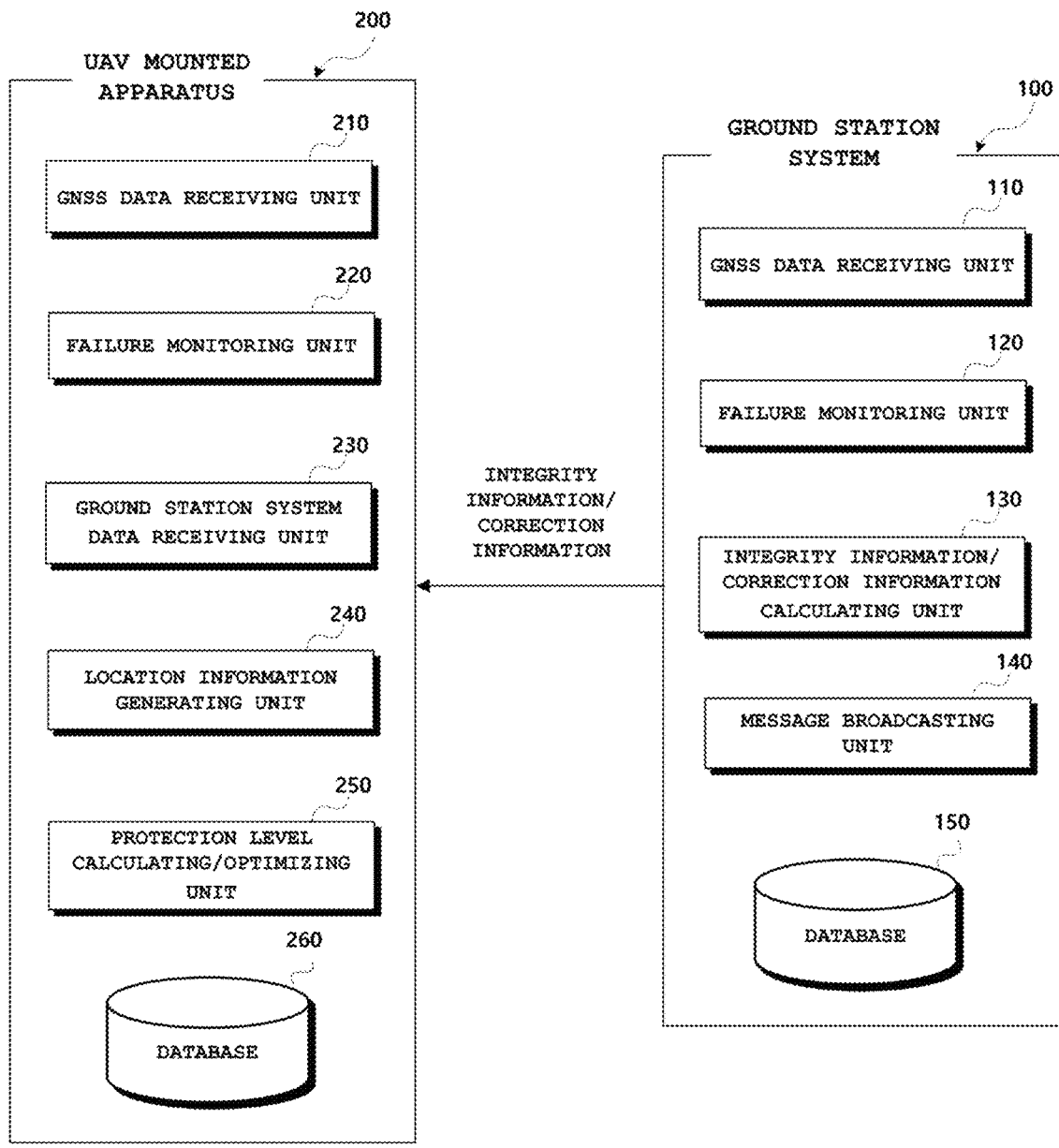

[Fig. 5]
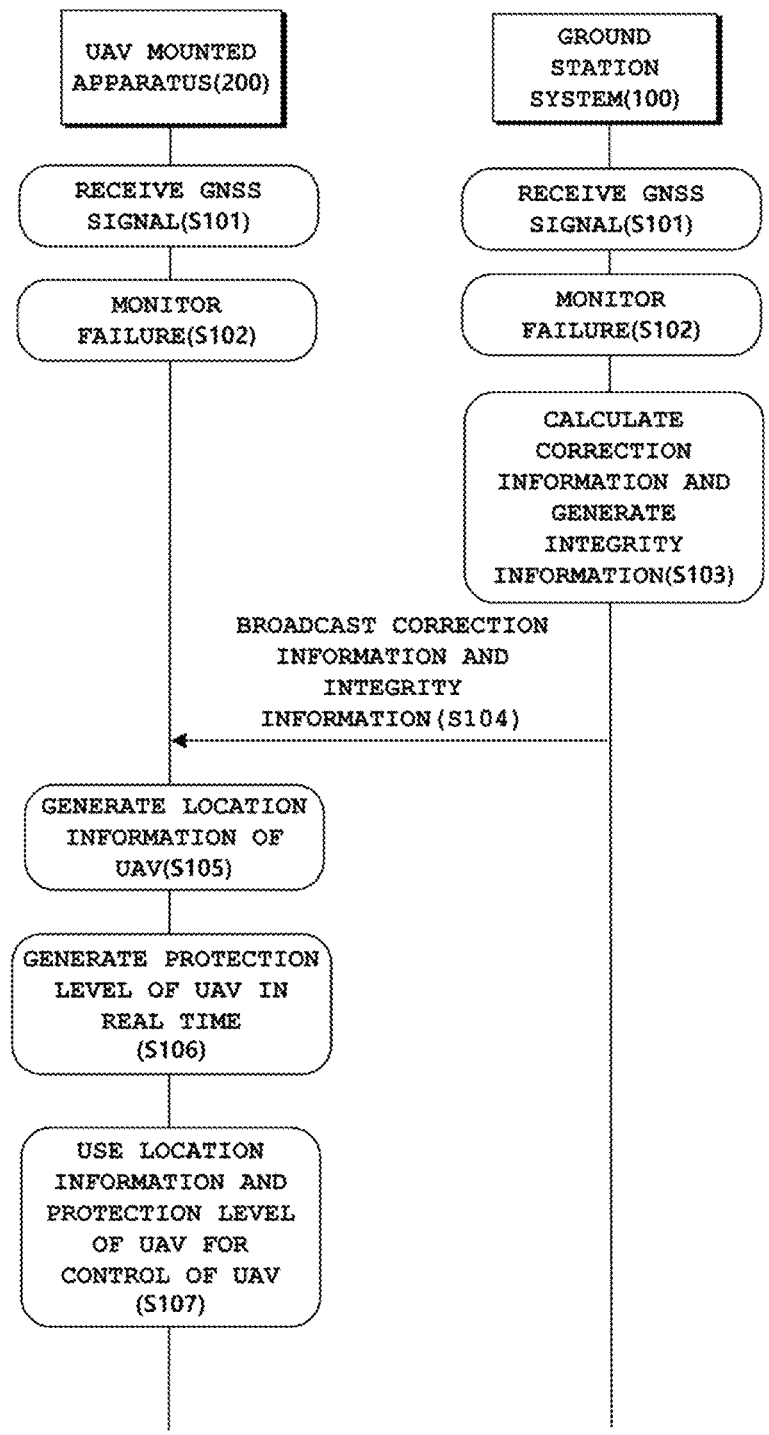

[Fig. 6]
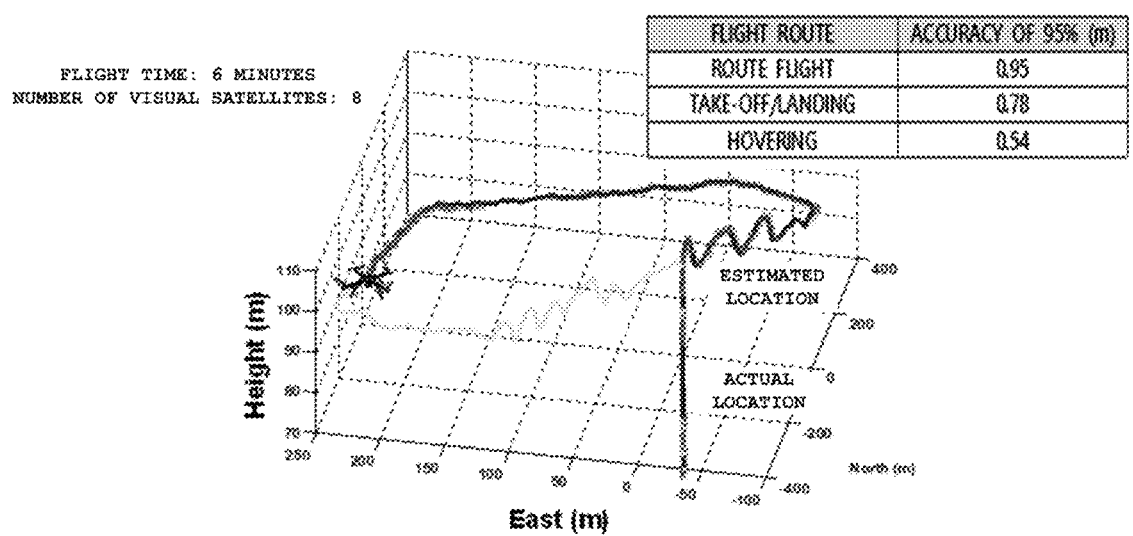

[Fig. 7]
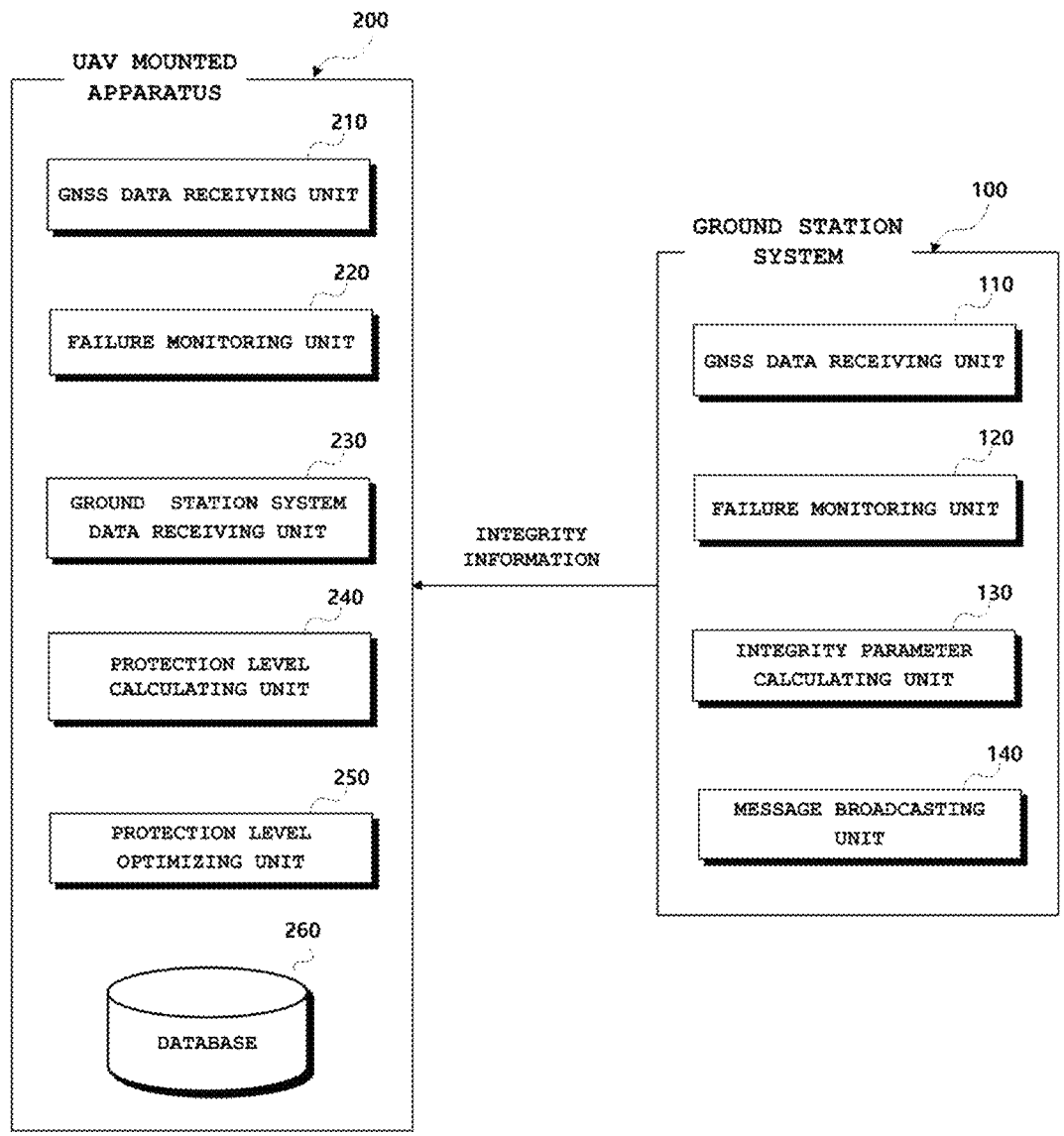

[Fig. 8]
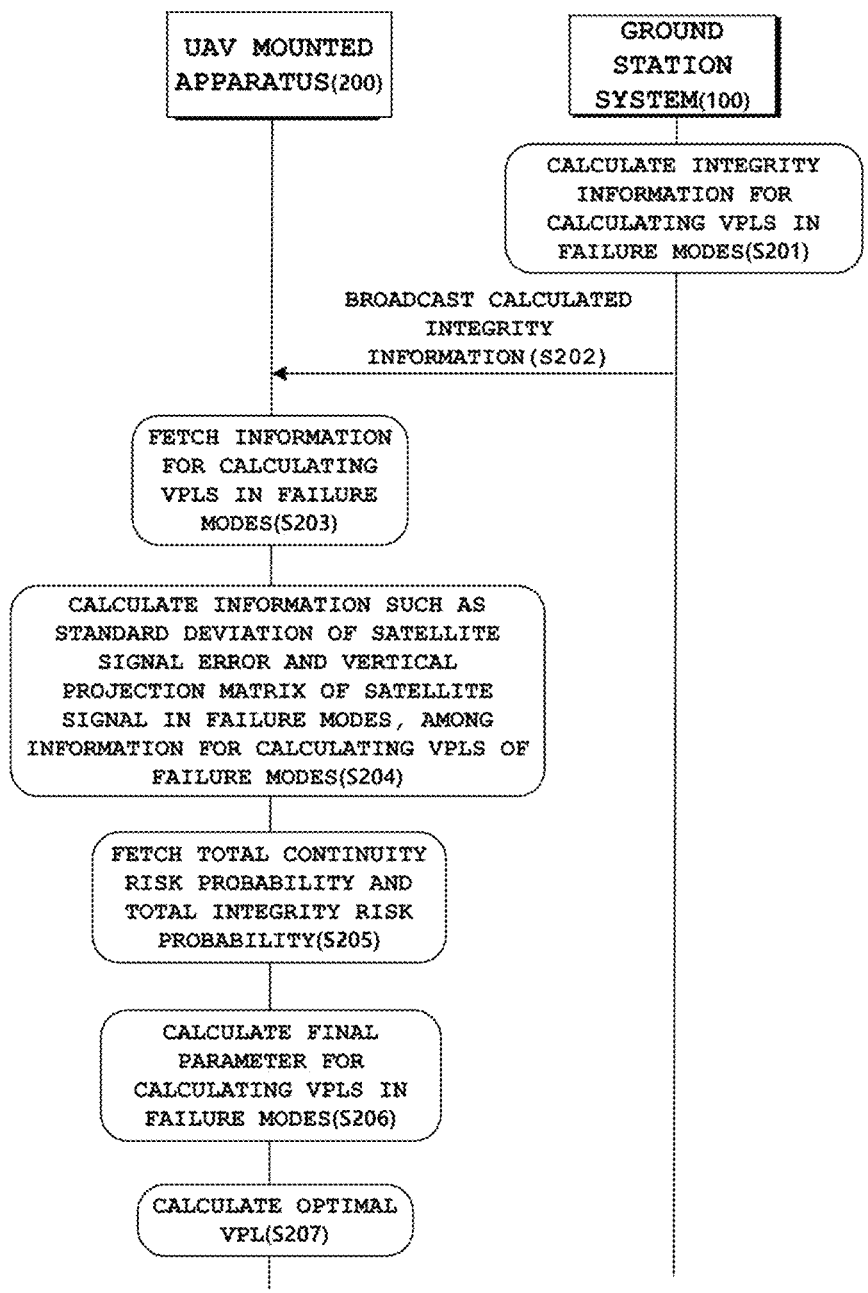

[Fig. 9]
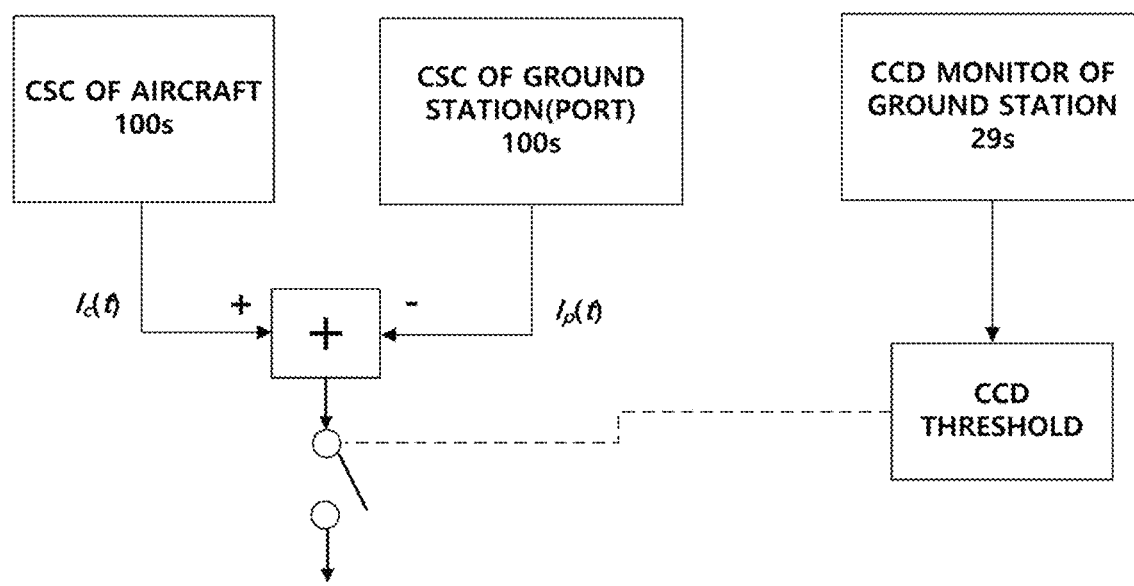

[Fig. 10]
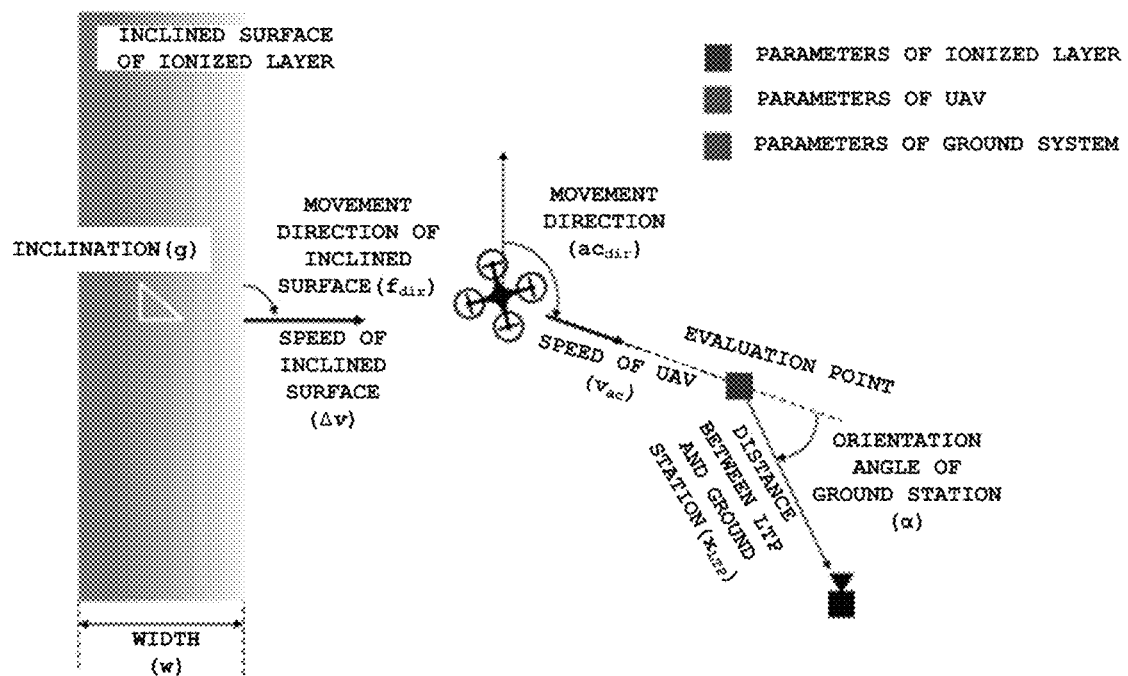

[Fig. 11]

| PARAMETER | MINIMUM VALUE | MAXIMUM VALUE | INTERVAL |
|---|---|---|---|
| $\Delta v$ (m/s) | -100 | 350 | 10 |
| g (mm/mm) | 200 | 500 | 20 |
| W (km) | 25 | 75 | 25 |
| $\Delta$W (km) | 0 | W | W/25 |
| $\alpha$ (deg) | -90 | 90 | 15 |
| $\beta$ (deg) | -90 | 90 | 10 |

[Fig. 12]

| ENVIRONMENT | ERROR EVALUATION POINT | FLIGHT SPEED OF UAV | MAXIMUM DISTANCE ERROR |
|---|---|---|---|
| A | 5 km | 15 m/s | 3 m |
| B | 20 km | 45 m/s | 10.5 m |

[Fig. 13]
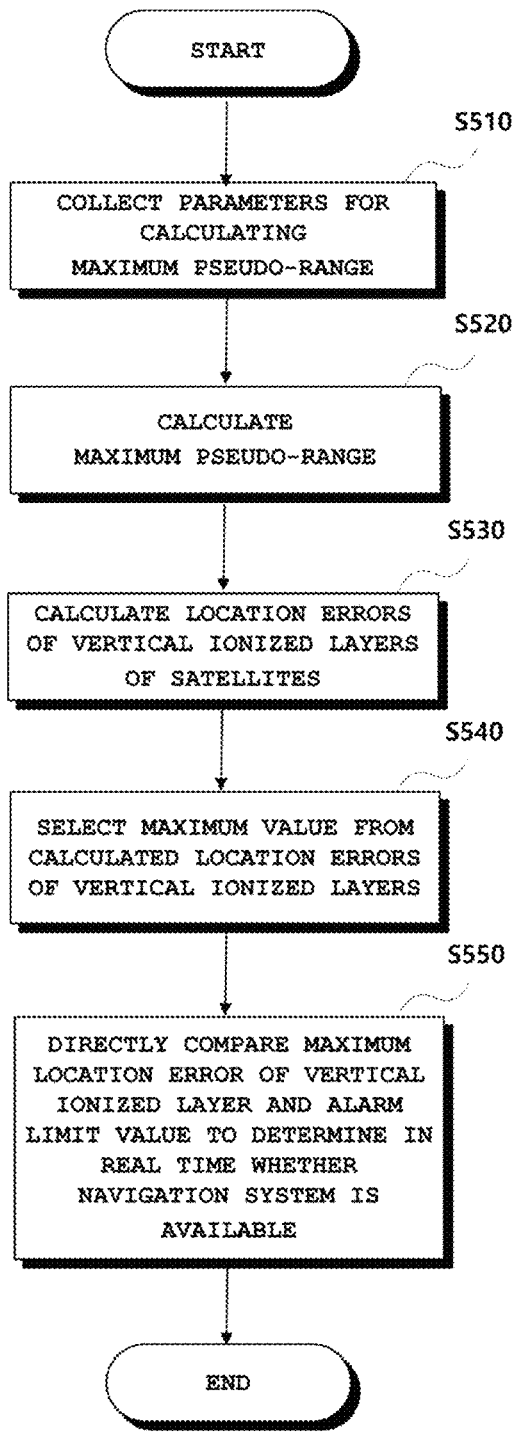

[Fig. 14]
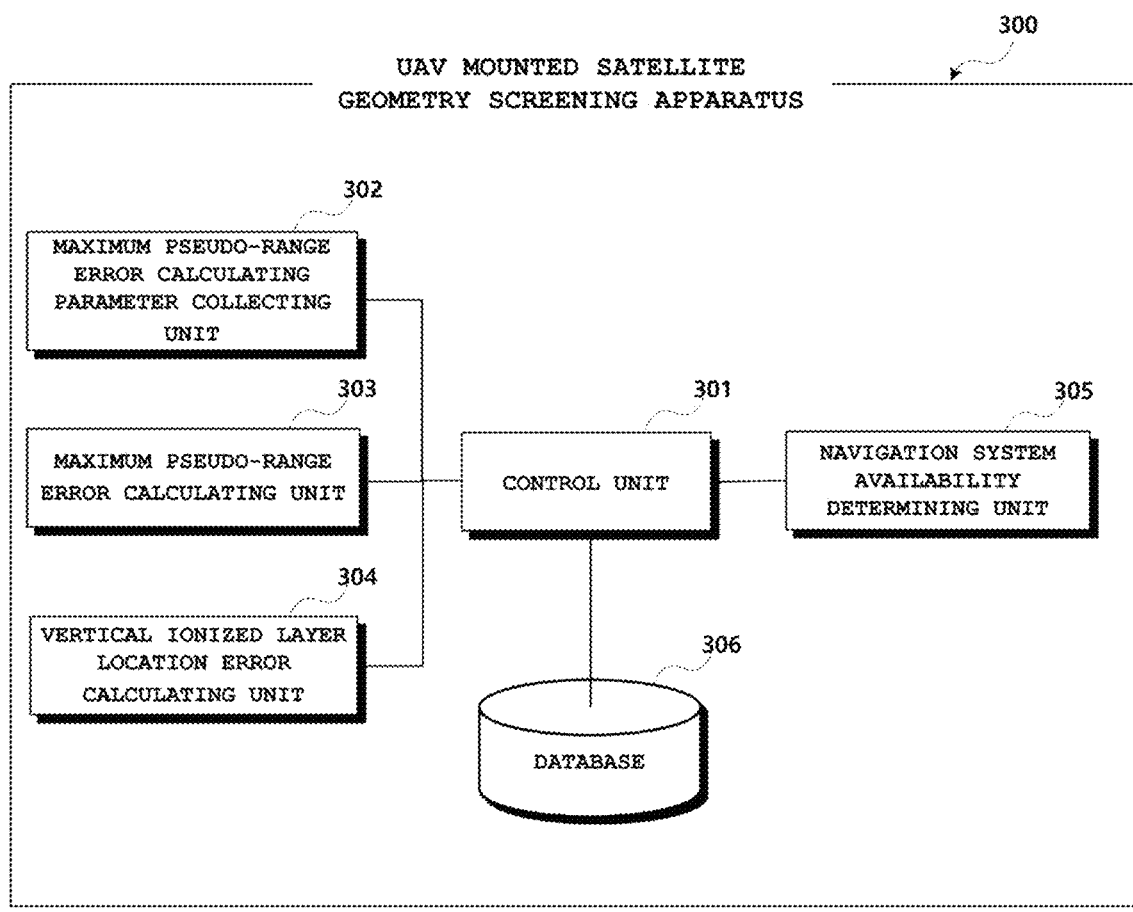

[Fig. 15(a)]
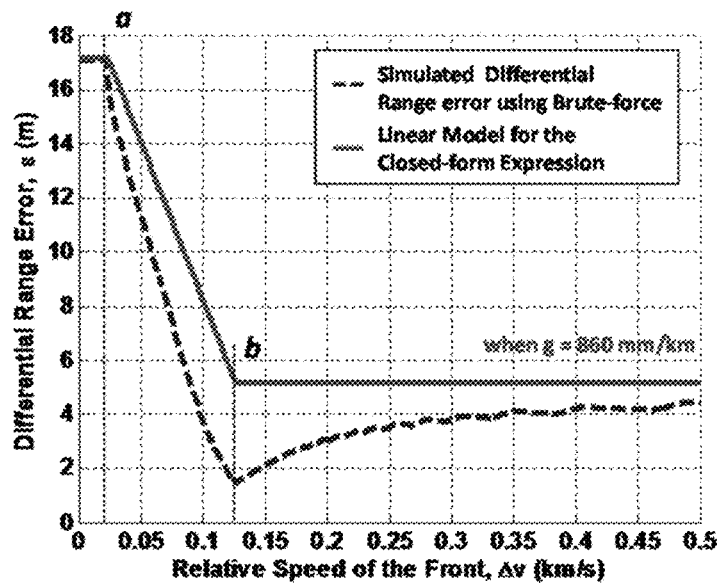
[Fig. 15(b)]
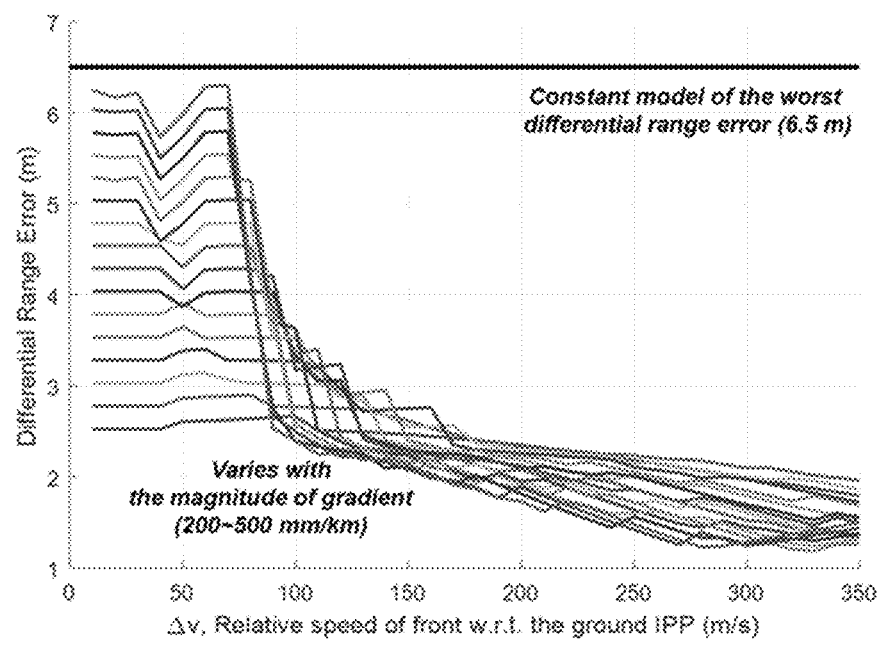

METHOD AND SYSTEM FOR LOCAL-AREA DIFFERENTIAL GNSS FOR UAV NAVIGATION, AND FOR GENERATING OPTIMAL PROTECTION LEVEL AND GEOMETRY SCREENING THEREFOR

BACKGROUND OF THE INVENTION

1. Field of the Invention

The present invention relates to a method and a system for a local-area differential GNSS for UAV navigation, and for generating an optimal protection level and geometry screening, and more particularly to a system that monitors an error and a failure of a GNSS navigation signal, broadcasts error correction information and integrity information to a UAV within a radius of about 20 km to allow the UAV to apply the corresponding information by a ground module, thereby improving the navigation accuracy of the UAV and allowing the UAV to fly by utilizing safe navigation information. Further, to achieve this, the present invention relates to a method and a system for decreasing a protection level of a system by optimally allocating integrities and continuity probabilities of failure modes based on integrity parameters of a ground station and calculating a maximum vertical position error due to ionospheric delay that may be generated due to an ionosphere abnormality phenomenon by a navigation user, thereby securing navigation safety.

2. Description of the Related Technology

FIG. 1 is a view illustrating a hardware installation restriction of a local-area differential GNSS for UAV navigation.

A navigation sensor that is most commonly used by an unmanned aerial vehicle (UAV) is a global navigation satellite system (GNSS) sensor, and may estimate absolute position values worldwide. However, because the GNSS sensor performs estimation of positions based on signals of a satellite that is transmitted far apart from the earth, there is a limit in supporting a precise navigation. In particular, an UAV that is operated within a civilian airspace has to monitor a failure of a sensor with a high possibility to prevent a damage to the civilian environments, and the UAV has to essentially consider an integrity concept that defines a boundary that may actually exist. As a related conventional technology, there is a GBAS that is a local-area differential GNSS for a manned aerial vehicle. The GBAS is a system that provides high accuracy and safety navigation to a manned aircraft using a GNSS signal, and monitors an error and a failure of a signal of the GNSS and broadcasts correction information and integrity information to the manned aircraft that approaches an airport by a ground station installed in the airport, helping a precise approach of the manned aircraft. However, as in FIG. 1, because the installation condition of the GBAS is very bothersome, costs are high, and the failure monitoring algorithm is very complex, there is a limit in supporting the commercial UAV. The local-area differential GNSS system for UAV navigation suggested by the present invention may support a safe navigation, such as precise landing or prevention of a collision by calculating a error bound at which an UAV may be actually present by using a navigation error model. The present invention develops a local-area differential GNSS system for UAV navigation for supporting a safe and precise navigation of a UAV. Through the present study, a local-area differential GNSS system for UAV navigation that may be applied to an UAV by reducing the complexity of installation restrictions/hardware and the complexity of an algorithm was invented. An UAV is provided with navigation correction information to improve navigation accuracy and navigation integrity is improved by monitoring various failures.

A ground station of a local-area differential-global navigation satellite system (LAD-GNSS) improves navigation accuracy by providing navigation correction information to an UAV that performs missions in a pre-defined range, and improves navigation integrity by monitoring a GNSS signal and a failure of the system. Further, a position bound at which an UAV is actually present is computed by using a navigation error model. That is, safe navigations, such as precise landing and prevention of a collision, are supported by calculating a protection level. The LAD-GNSS ground station broadcast integrity information to the UAV, and the mounted system of the UAV may calculate a protection level by using the broadcast integrity information. When the calculated protection level exceeds an alert limit value that is a navigation requirement, the mounted system determines that a severe error is currently generated and alerts the user. The user who was alerted maintains the height of the UAV high or performs a safe flight, for example, by converting the flight to a manual flight. In a low-altitude airspace in which the UAV flies close to the ground, a value of an alert limit that is a navigation requirement is smaller to prevent collision from ground obstacles, and a protection level value of the navigation system for satisfying the navigation requirement also has to decrease. Accordingly, in order to operate the UAV in a low-altitude airspace, an optimal protection level calculating system has to be developed.

Further, a ground-based augmentation system (GBAS) is a system that provides GNSS error correction information and integrity information to the user for precise approach to an airport and automatic landing of the aircraft. When a severe ionospheric storm is generated during the operation of the system, an ionospheric delay is rapidly changed, and when correction information generated during ionospheric anomaly condition is used by the augmentation system user, the accuracy of the location estimation value of the user is remarkably decreased. Accordingly, if an ionospheric anomaly is not detected and alerted properly through ground monitoring, the user may experience hazardous simulation. The GBAS operates a code-carrier divergence monitor and a satellite geometry screening algorithm by the ground apparatus. The local-area differential GNSS (LAD-GNSS) is a type of GBAS which costs is reduced and the complexity of the system is simplified, and is a system that is suggested for safe operation of navigation of an UAV. Because the LAD-GNSS calculates correction information by applying the principle of the DGPS like the GBAS, an aspect of the system that is influenced by the ionized layer abnormality phenomenon is the same as that of the GBAS. In correspondence to the ionized layer abnormality phenomenon, the LAD-GNSS introduced a CCD monitor, a satellite geometry screening technique, and a dual solution ionospheric gradient monitoring algorithm (DSGMA). The common points and the differences of the satellite geometry screening techniques operated by the GBAS and the LAD-GNSS are as follows. First, the common points are that the ionosphere monitor is a monitor in the final step that calculates maximum value of a vertical position error in which an anomalous ionospheric phenomenon is not detected. The differences are that the DSIGMA is added in the LAD-GNSS while the GBAS uses only the CCD monitor.

PRIOR TECHNICAL DOCUMENTS

Patent Documents (Patent Document 1) KR10-0980762 B1

SUMMARY OF THE INVENTION

The present invention has been made in an effort to solve the above-mentioned problems, and develops a local-area differential GNSS system for UAV navigation including a ground module and a mounted module. The ground module receives a GNSS navigation signal, calculates GNSS navigation error information, and generates correction information, and monitors a failure through a simplified failure monitoring algorithm. The mounted module provides a system and a method for receiving a message that is broadcast by the ground module, and calculating precise and safe navigation information of an UAV by applying the message.

Further, the present invention broadcasts integrity information for calculating protection levels of the system failure modes and calculates an optimal protection level obtained by removing the conservativeness from the UAV mounted apparatus based on the integrity information by the ground station system, designs a system having calculation efficiency and flexibility by applying a satellite geometry screening technique that has been operated by the ground apparatus to the UAV mounted navigation apparatus, and allows a more precise pseudo-range error simulation by adding a DSIGMA that considers directionality in a process of calculating a maximum pseudo-range error calculating process by the LAD-GLASS.

Further, the present invention allows prompt screening of satellite geometry without a need for a calculation process for many satellite combinations because the UAV mounted navigation apparatus (user) knows the satellite geometry used for positioning thereof by applying the satellite geometry screening technique to the UAV mounted navigation apparatus, and unlike the GBAS that has determine usability of the subsets of specific satellite geometry through expansion of a vertical protection level, allows a prompt navigation control of the UAV by determining an availability by directly comparing an MIEV value with an alert limit value in the LAD-GNSS performed only for one satellite geometry.

In accordance with an aspect of the present invention, there is provided a method of generating navigation information for navigation of an unmanned aerial vehicle (UAV) while communicating with a ground station system, by an UAV mounted apparatus, in which a local-area differential GNSS for UAV navigation is realized, the method comprising: (a) receiving GNSS data from a satellite; (b) monitoring a failure based on a received signal to remove a signal or a receiver that failed; (c) receiving data including correction information and integrity information that are broadcast by the ground station system; (d) generating current location information of the UAV by applying the correction information and the integrity information to the received GNSS data; and (e) calculating an optimized protection level from protection levels calculated for failure modes using the information received from the ground station system.

The failure of (b) includes at least one of a failure of a satellite, a delay of a signal, a failure of a signal, and a failure of a receiver of the UAV mounted apparatus.

The delay of a signal and the failure of a signal due to an ionized layer is calculated in consideration of only satellite geometry that is used by the UAV mounted apparatus.

The protection level of (e) is a vertical protection level (VPL), and the VPL is obtained from VPL values of a reference receiver fault mode, an ephemeris fault mode, an excessive acceleration (EA) fault mode, and a code carrier divergence (CCD) fault mode.

In (a), the receiver that receives the GNSS data is the same receiver as the receiver used by the ground station system.

In accordance with another aspect of the present invention, there is provided a method of calculating an optimal protection level for a local-area differential GNSS for UAV navigation, by a mounted apparatus mounted on the UAV, the method comprising: (a) receiving integrity information for calculating vertical protection levels (VPLs) for failure modes, from a ground station system; (b) fetching information (hereinafter, referred to as 'first information') stored in a database of the UAV mounted apparatus as information for calculating VPLs for failure modes, from the database; (c) calculating information (hereinafter, referred to as 'second information') for calculating the VPLs for the failure modes from received GNSS data; (d) calculating final parameters for calculating the VPLs for the failure modes by using the integrity information, the first information, and the second information to calculate the VPLs for the failure modes; and (e) calculating an optimal VPL from the VPLs for the calculated failure modes.

When the final parameters of (d) are $\Psi m$, $\theta m$, and $\beta m$, the VPLs for the failure modes are $$VPL(m) = k_{HMI,m} \Psi_m + k_{cont,m} \theta_m + \beta_m$$

and m is a specific failure mode, and wherein $$k_{HM1,m} = Q^{-1}\left(1 - \frac{PHMI_m}{2P_{ap,m}}\right),$$

$$k_{cont,m} = Q^{-1}\left(1 - \frac{P_{cont,m}}{2}\right)$$

wherein integrity risk probability ($PHMI_m$) and a continuity risk probability ($P_{cont,m}$) of the m-th failure mode are parameters that are intended to be optimized, $P_{ap,m}$ is a constant value that is established as a probability of generating a fault of the m-th failure mode in advance, and $Q^{-1}$ is an inverse function of unit Gaussian cumulative distribution function.

The first information includes a probability of generating failures corresponding to the failure modes.

The second information includes vertical projection matrixes of satellite signals and a standard deviation of a satellite signal error.

The optimization of the VPL of (e) is performed by fetching a total integrity probability ($PHMI_{total}$) and a total continuity probability ($P_{total,cont}$) that is preset to be satisfied from the database, and the VPL values of all the failure modes are the same when a sum of the integrity probabilities of the failure modes is the same as the total integrity probability ($PHMI_{total}$) and a sum of the continuity probabilities of the failure modes is the same as the total continuity probability ($P_{total,cont}$).

In accordance with another aspect of the present invention, there is provided a method of screening satellite geometry for alleviating a thread of an ionized layer, by a satellite geometry screening apparatus mounted on an UAV, the method comprising: (a) collecting parameters for calculating a maximum pseudo-range error; (b) calculating the maximum pseudo-range error from the parameters; (c) calculating vertical position errors of satellites due to ionospheric delay; (d) determining a final value of vertical position error due to ionospheric delay, from the calculated vertical position errors of the satellites; and (e) determining availability of a navigation system by using the final value of vertical position error due to ionospheric delay.

The parameters of (a) and (b) include parameters having directionalities.

The vertical position errors of the satellites of (c) is calculated from $$IEV_i = |R \times S_{v,i}|$$

wherein IEVi is a vertical position error of an i-th satellite, R is a maximum pseudo-range error that is generated due to an ionospheric gradient, and Sv,i is a vertical satellite geometry coefficient of an i-th satellite.

The final value of vertical position error due to ionospheric delay of (d) is determined as a maximum value of absolute values of the calculated vertical position errors due to ionospheric delay of the satellites.

The determination of the availability of the navigation system of (e) includes directly comparing a position error limit (hereinafter, 'alert limit') required in an operation area and determining that the navigation system is usable when the final value of vertical position error due to ionospheric delay is not more than the alert limit, by the UAV.

BRIEF DESCRIPTION OF THE DRAWINGS

Hereinafter, exemplary embodiments of the present invention for achieving the effects will be described in detail with reference to the accompanying drawings.

FIG. 1 is a view illustrating a hardware installation restriction of a local-area differential GNSS for UAV navigation according to the related art;

FIG. 2 is a conceptual view of a system for a local-area differential GNSS for UAV navigation according to the present invention;

FIG. 3 is a schematic diagram of a ground module and an UAV mounted module of a system for a local-area differential GNSS for UAV navigation according to the present invention;

FIG. 4 is a block diagram of a ground module and an UAV mounted module of a system for a local-area differential GNSS for UAV navigation according to the present invention;

FIG. 5 is a diagram of a sequence for UAV navigation according to the present invention;

FIG. 6 is a view illustrating a flight route by performing flight of an UAV while applying the local-area differential GNSS system for UAV navigation of the present invention;

FIG. 7 is a block diagram illustrating the internal configurations of the ground station system 100 and the UAV mounted apparatus 200 that constitute an optimal protection level calculating system for a local-area differential GNSS for UAV navigation;

FIG. 8 is a sequence diagram of a method for calculating an optimal protection level for a local-area differential GNSS for UAV navigation that is realized through the ground station system 100 and the UAV mounted apparatus 200;

FIG. 9 is a flowchart of a simulation for calculating a pseudo-range error of an ionosphere of a GBAS;

FIG. 10 is a view illustrating a situation to which a pseudo-range error calculation simulation parameter of an ionosphere of a local-area differential GNSS of the present invention is applied;

FIG. 11 is a table representing an investigation range for error calculation simulation parameters of pseudo-range errors of an ionosphere;

FIG. 12 is an embodiment of maximum pseudo-range error results for scenarios according to an UAV operating environment;

FIG. 13 is a flowchart of, the satellite geometry screening apparatus mounted on the UAV of the LAD-GNSS, performing a satellite geometry screening method of the present invention;

FIG. 14 is a view illustrating a configuration of the UAV mounted satellite geometry screening apparatus; and FIGS. 15(a) and 15(b) are views illustrating comparison of a maximum pseudo-range error calculation simulation result FIG. 15(a) in the GBAS and a maximum pseudo-range error calculation simulation result FIG. 15(b) of the LAD-GNSS of the present invention.

DETAILED DESCRIPTION OF THE INVENTION

Hereinafter, exemplary embodiments of the present invention will be described in detail with reference to the accompanying drawings. Prior to the description of the present invention, it will be noted that the terms and wordings used in the specification and the claims should not be construed as general and lexical meanings, but should be construed as the meanings and concepts that agree with the technical spirits of the present invention, based on the principle stating that the concepts of the terms may be properly defined by the inventor(s) to describe the invention in the best manner. Therefore, because the examples described in the specification and the configurations illustrated in the drawings are merely for the preferred embodiments of the present invention but cannot represent all the technical sprints of the present invention, it should be understood that various equivalents and modifications that may replace them can be present.

A system for a local-area differential GNSS for an UAV navigation suggested by the present invention includes a ground module and a mounted module. The ground module receives a GNSS signal, monitors a failure of navigation, and generates correction information and integrity information, and transmits the generated correction information and integrity information to the mounted module through a modem. The mounted module that received the correction information and the integrity information calculates a position of a GNSS based unmanned machine by applying the corresponding information to the GNSS signal received by the mounted module. The calculated GNSS based position information is delivered to an unmanned controller to be used for flight of an UAV. The navigation system for an unmanned aerial vehicle suggested by the present invention may secure accuracy and navigation safety that are remarkably high as compared with those of a system that uses only a conventional GNSS.

FIG. 2 is a conceptual view of a system for a local-area differential GNSS for UAV navigation according to the present invention.

The present invention relates to a system for improvement of accuracy and safety of navigation of a UAV, and more particularly to a system that monitors an error and a failure of a GNSS navigation signal by a ground module, broadcasts error correction information and integrity information to a UAV within a radius of about 20 km to allow the UAV to apply the corresponding information, thereby improving the navigation accuracy of the UAV and allowing the UVA to fly by utilizing safe navigation information.

FIG. 3 is a schematic diagram of a ground module and an UAV mounted module of a system for a local-area differential GNSS for UAV navigation according to the present invention. FIG. 4 is a block diagram of a ground module and an UAV mounted module of a system for a local-area differential GNSS for UAV navigation according to the present invention. FIG. 5 is a diagram of a sequence for UAV navigation according to the present invention.

Referring to FIGS. 4 and 5, the system includes a ground station system 100 and a UAV mounted apparatus 200.

The ground station system 100 includes a GNSS data receiving unit 110 configured to receive global navigation satellite system (GNSS) data from a satellite (S101), a failure monitoring unit 120 configured to monitor various failures (a failure of the satellite, a failure of a signal, a failure of a receiver of a ground station system, and the like) based on the received signal and remove the failed signal or receiver (S102), an integrity information/correction information calculating unit 130 configured to calculate various pieces of integrity information by using the received GNSS data, compare the received signal with the location of the ground module precisely calculated in advance, and generate error correction information (S103), a message broadcasting unit 140 configured to broadcast a message including the calculated integrity information to the UAVs (S104), and a database 150 configured to store data including the correction information and the integrity information. The generated error correction information and integrity information is delivered to the UAV mounted apparatus 200 through a modem.

The UAV mounted apparatus 200 includes a GNSS data receiving unit 210 configured to receive GNSS data from a satellite (S101), a failure monitoring unit 220 configured to monitor various failures (a failure of a satellite, a failure of a signal, a delay of a signal, a failure of a receiver of the UAV mounted apparatus) based on the received signal and remove the failed signal or receiver (S102), a ground station system data receiving unit 230 configured to receive data including correction information and integrity information that are broadcast by the ground station system 100 (S104), a position information generating unit 240 configured to generate current position information of an unmanned machine by applying the correction information and the integrity information to the GNSS data received by the GNSS data receiving unit 210 (S105), a protection level calculating/optimizing unit 250 configured to calculate an optimized protection level from protection levels calculated for the failure modes by utilizing the integrity information received from the ground station system 100, and a database 260 configured to store various pieces of data related to position information and the protection level. The position information and protection level generated in this way are utilized in control of the UAV. Although not illustrated, each of the ground station system 100 and the UAV mounted apparatus 200 includes a control unit configured to perform a series of processes related to generation of the navigation information of the UAV mounted apparatus by controlling the modules of the ground station system 100 and the UAV mounted apparatus 200.

The local-area differential GNSS system architecture basically is based on a ground based augmentation system architecture that a local-area differential GNSS system that has been developed for a manned aerial vehicle. However, the system suggested by the present invention reduces the complexity of an algorithm and alleviates an installation restriction condition of hardware for the purpose of a commercial system for a local-area differential GNSS for UAV navigation.

In the GBAS, antennas of ground equipment are generally installed at intervals of several hundred meters to alleviate an multi-path error. The local-area differential GNSS system for an UAV suggests that the intervals of the antennas are several ten meters in consideration of the characteristics of a commercial system that is difficult to secure a wide space, and installation of low-priced antennas instead of high-priced multipath-limiting antennas are considered. An multi-path error increases due to a hardware change, and this aspect may be solved by improving an algorithm performance.

Through the algorithm simplification, two algorithms that are known to be most complex in the existing GBAS are simplified.

The first algorithm corresponds to signal deformation monitoring and is known that the forms thereof are similar in the same receiver model, and a monitor for deformation of a satellite signal that is offset through correction information may be removed with a restriction condition that the receivers such as the ground station system 100 and the UAV mounted apparatus 200 have to be used. That is, by using the same receiver in the ground station system 100 and the UAV mounted apparatus 200, a burden of monitoring deformation of a satellite signal has disappeared.

The second monitor is a geometry screening monitor. The fault monitoring unit 220 of the UAV mounted apparatus 200, which has been mentioned above, corresponds to this. The monitor, that is, fault monitoring unit 220 corresponds to a monitor that protects an UAV (user) from an error of a satellite signal generated due to an ionosphere, that is, a signal delay/signal fault due to an ionosphere, by monitoring the error. Unlike a GBAS in which such a monitor is installed in a conventional ground station system, in the navigation system for an UAV of the present invention, by installing (220) the monitor in the UAV mounted apparatus 200, a worst user error is calculated in consideration of only a satellite geometry that is being currently used by an UAV instead of calculating all satellite geometries as in the ground station system. Through this, it is possible to drive a UAV precisely and safely while simplifying an algorithm.

Even with the GNSS antenna/receiver having a low performance as compared with a manned aerial vehicle, hardware of a low performance, and a limited installation restriction condition, performance of a vertical protection level (VPL) may be improved by utilizing an optimal protection level calculation algorithm. Through the optimal protection level calculation algorithm, the system calculate in real time all the VPLs including the VPLs that are not calculated in consideration of the complexity of algorithm in the existing GBAS to reduce the size of the final VPL by calculating a total of five kinds of VPLs. The five kinds of VPLs refer to the VPL values obtained in a fault-free mode, a reference receiver fault mode, an ephemeris fault mode, an excessive acceleration (EA) fault mode, and a code carrier divergence (CCD) fault mode.

Although the sizes of some VPLs increase by partially fixing the sizes of the probabilities of integrity loss used when the sizes of the remaining VPLs are calculated, by calculating the sizes of the remaining VPLs in advance, the integrity loss probabilities may be optimally divided for the failure modes in consideration of the corresponding situations (a satellite geometry, an error, and the like) by calculating the VPLs in real time by the UAV mounted apparatus 200 according to the present invention so that the final sizes of the VPLs decrease.

FIG. 6 is a view illustrating a flight route by performing flight of an UAV while applying the local-area differential GNSS system for UAV navigation of the present invention.

While actually performing flight, the UAV received correction information and integrity information broadcast by the ground module, calculated the location thereof, and delivered the calculated location to a controller. After the flight, It was identified location accuracy is within 1 m in all times during the flight of about six minutes.

The local-area differential GNSS system for UAV navigation suggested by the present invention is expected to be utilized for supporting a precise and safe navigation of an UAV to support missions that require high-performance navigation, such as a precise approach, an automatic take-off/landing, a platooning flight of UAVs.

FIG. 7 is a block diagram illustrating the internal configurations of the ground station system 100 and the UAV mounted apparatus 200 that constitute an optimal protection level calculating system for a local-area differential GNSS for UAV navigation. FIG. 8 is a sequence diagram of a method for calculating an optimal protection level for a local-area differential GNSS for UAV navigation that is realized through the ground station system 100 and the UAV mounted apparatus 200.

The ground based augmentation system (GBAS) that is a local-area differential GNSS for a manned aerial vehicle calculates horizontal protection levels (HPLs) and vertical protection levels (VPLs) for the three failure modes and uses a maximum value of the values of the three failure modes as a representative protection level. Because the guarantee of a vertical safety is more difficult than the guarantee of a horizontal safety in an aspect of navigation safety, a vertical direction will be focused in the present invention. The three failure modes for the vertical protection levels calculated in the GBAS is fault-free (H0), reference receiver fault (H1), and ephemeris fault, and the calculation equations are as follows.

$$VPL = \max(VPL_{H0}, VPL_{H1}, VPL_3) \quad \text{[Equation 1]}$$

$$VPL_{H0} = k_{HM1,H0}\sqrt{\sum_{i=1}^{N} S_{vert,i}^2 \sigma_i^2} \quad \text{[Equation 2]}$$

$$k_{HM1,H0} = Q^{-1}\left(1 - \frac{PHMI_{H0}}{2}\right) \quad \text{[Equation 2-1]}$$

$$VPL_{H1,m} = |B_{vert,m}| + k_{HM1,H1,m}\sqrt{\sum_{i=1}^{N} S_{vert,i}^2 \sigma_{H1,i}^2} \quad \text{[Equation 3]}$$

$$k_{HM1,H1,m} = Q^{-1}\left(1 - \frac{PHMI_{H1,m}}{2P_{ap,H1}}\right) \quad \text{[Equation 3-1]}$$

$$B_{vert,m} = \sum_{i=1}^{N} S_{vert,i} B_m^i \quad \text{[Equation 3-2]}$$

$$VPL_e(j) = |S_{vert,j}||x|P_j + k_{HM1,e,j}\sqrt{\sum_{i=1}^{n} S_{vert,i}^2 \sigma_i^2} \quad \text{[Equation 4]}$$

$$P_j = (k_{cont,e,j} + K_{HMI,e,j})\frac{\sigma_{t_e}}{R_j} \quad \text{[Equation 4-1]}$$

$$k_{HM1,e,j} = Q^{-1}\left(1 - \frac{PHMI_{e,j}}{2P_{ap,e}}\right) \quad \text{[Equation 4-2]}$$

$$k_{cont,e,j} = Q^{-1}\left(1 - \frac{P_{cont,e,j}}{2}\right) \quad \text{[Equation 4-3]}$$

Where $\sigma_i$ is a standard deviation of an i-th satellite signal error, $S_{vert}$ is a vertical projection matrix of a satellite signal, $PHMI_{H0}$ is an integrity risk probability allocated to a fault-free (H0) mode, $PHMI_{H1}$ is an integrity risk probability allocated to a reference receiver fault (H1) mode, $PHMI_e$ is an integrity risk probability allocated to an ephemeris fault mode, $B_{vert,j}$ is a vertical B-value of a j-th ground station receiver, $\sigma_{H1}$ is a standard deviation of a satellite signal error in a reference receiver fault situation, $P_{ap,H1}$ is a probability of generating a reference receiver fault, is a probability of generating an ephemeris fault, $P_i$ is a P-value of an i-th satellite, x is a distance between a ground station and an antenna of the aircraft, $R_i$ is a distance between an i-th satellite and a ground station, $\sigma_{t_e}$ is a standard deviation of a test statistic of an ephemeris fault monitoring algorithm, $P_{cont,e}$ is a continuity risk probability allocated to an ephemeris fault mode, and $Q^{-1}$ is an inverse function of a unit Gaussian cumulative distribution.

The ground station broadcasts the P-value and the B-value to the user, and the user calculates the VPLs based on the information and the integrity and the continuity risk probabilities allocated to the failure modes in advance. If the integrity and the continuity risk probabilities are optimally allocated in real time such that the VPL values of the failure modes have the same value, the VPLs may be reduced. The reduced VPLs allow the UAV to be operated closer to the ground.

In order to calculate the optimal VPL, the optimal protection level calculating system according to the present invention calculates a VPL by optimally allocating the integrity and the continuity risk probability in real time. In this algorithm, two kinds of VPLs for two fault modes are newly established along with three kinds of VPLs of the existing GBAS, and then and optimal VPL is calculated based on the five VPLs.

First, the VPLs for the excessive acceleration (EA) fault mode and the code carrier divergence (CCD) fault mode were newly established as follows.

$$VPL_{EA}(j) = k_{cont,EAj} \cdot (|S_{vert,j}| \cdot 0.5 \cdot \tau \cdot (\tau + T)\sigma_{t_{EA}}) + \quad \text{[Equation 5]}$$
$$k_{HMI_{EA,j}}\left(|S_{vert,j}| \cdot 0.5 \cdot \tau \cdot (\tau + T)\sigma_{t_{EA}} + \sqrt{\sum_{i=1}^{n} S_{vert,i}^2 \sigma_i^2}\right)$$

$$k_{cont,EA,j} = Q^{-1}\left(1 - \frac{P_{cont,EA,j}}{2}\right) \quad \text{[Equation 5-1]}$$

$$k_{HM1,EA,j} = Q^{-1}\left(1 - \frac{PHMI_{EA,j}}{2P_{ap,EA}}\right) \quad \text{[Equation 5-2]}$$

$$VPL_{CCD}(j) = k_{cont,CCD,j} \cdot (|S_{vert,j}| \cdot MDE_{CCD}) + \quad \text{[Equation 6]}$$
$$k_{HMI,CCD,j} \cdot \left(|S_{vert,j}| \cdot MDE_{CCD} + \sqrt{\sum_{i=1}^{n} S_{vert,i}^2 \sigma_i^2}\right)$$

$$k_{cont,CCD,j} = Q^{-1}\left(1 - \frac{P_{cont,CCD,j}}{2}\right) \quad \text{[Equation 6-1]}$$

$$k_{HMI,CCD,j} = Q^{-1}\left(1 - \frac{PHMI_{CCD,j}}{2P_{ap,CCD}}\right) \quad \text{[Equation 6-2]}$$

Where $\sigma_i$ is a standard deviation of an i-th satellite signal error, $S_{vert}$ is a vertical projection matrix of a satellite signal, PHMI$_{EA}$ is an integrity risk probability allocated to an excessive acceleration fault mode, PHMI$_{CCD}$ is an integrity risk probability allocated to a code carrier divergence fault mode, P$_{cont,EA}$ is a continuity risk probability allocated to an excessive acceleration fault mode, P$_{cont,CCD}$ is a continuity risk probability allocated to a code carrier divergence fault mode, P$_{ap,EA}$ is a probability of generating an excessive acceleration fault, P$_{ap,CCD}$ is a probability of generating a code carrier divergence fault, τ is a time interval between a time at which the ground station generates correction information and a time at which the aircraft applies the correction information, T is a sampling time of 0.5 seconds, σ$_{tEA}$ is a standard deviation of a test static of a monitoring algorithm of an excessive acceleration fault mode, and MDE$_{CCD}$ is a minimum detectable error of a CCD monitoring algorithm.

The newly established two kinds of VPLs and the existing three kinds of VPLs may be summarized as follows.

$$VPL_{H0} = k_{HMI,H0} \sqrt{\sum_{i=1}^{n} S_{vert,i}^2 \sigma_i^2} \qquad \text{[Equation 7]}$$

$$VPL_{H1}(m) = k_{HMI,H1,m} = \sqrt{\sum_{i=1}^{n} S_{vert,i}^2 \sigma_{HLi}^2} + \left|\sum_{i=1}^{N} S_{vert,i} B_m^i\right| \qquad \text{[Equation 8]}$$

$$VPL_e(j) = k_{cont,e,j} \cdot \left(\frac{|S_{vert,j}||x|}{R_j}\sigma_{t_e}\right) + \qquad \text{[Equation 9]}$$
$$k_{HMI,e,j}\left(\frac{|S_{vert,j}||x|}{R_j}\sigma_{t_e} + \sqrt{\sum_{i=1}^{n} S_{vert,i}^2 \sigma_i^2}\right)$$

$$VPL_{EA}(j) = k_{cont,EAj} \cdot (|S_{vert,j}| \cdot 0.5 \cdot \tau \cdot (\tau + T)\sigma_{tEA}) + \qquad \text{[Equation 10]}$$
$$k_{HMI,EA,j}\left(|S_{vert,j}| \cdot 0.5 \cdot \tau \cdot (\tau + T)\sigma_{tEA} + \sqrt{\sum_{i=1}^{n} S_{vert,i}^2 \sigma_i^2}\right)$$

$$VPL_{CCD}(j) = k_{cont,CCD,j} \cdot (|S_{vert,j}| \cdot MDE_{CCD}) + \qquad \text{[Equation 11]}$$
$$k_{HMI,CCD,j} \cdot \left(|S_{vert,j}| \cdot MDE_{CCD} + \sqrt{\sum_{i=1}^{n} S_{vert,i}^2 \sigma_i^2}\right)$$

The five kinds of VPLs for the failure modes may be represented in a general equation as follows.

$$VPL(m) = k_{HMI,m}\psi_m + k_{cont,m}\theta_m + \beta_m \qquad \text{[Equation 12]}$$

$$k_{HMI,m} = Q^{-1}\left(1 - \frac{PHMI_m}{2P_{ap,m}}\right) \qquad \text{[Equation 12-1]}$$

$$k_{cont,m} = Q^{-1}\left(1 - \frac{P_{cont,m}}{2}\right) \qquad \text{[Equation 12-2]}$$

In the above equation, the integrity risk probability (PHMI$_m$) and the continuity risk probability (P$_{cont,m}$) of the m-th failure mode are parameters that are intended to be optimized, and P$_{ap,m}$ is a probability of generating a fault of a m-th failure mode and is a constant value that has been established in advance. Further, ψ$_m$, θ$_m$, and β$_m$ are constants, and are parameters that are calculated by the UAV mounted apparatus 200 by putting information of the ground station, the GNSS data, and information of the database together.

The VPL may be optimized based on and the total integrity probability and the total continuity probability that have to be satisfied by a general model of the VPL the system. When the sum of the integrity probabilities and the sum of the continuity probabilities of the failure modes are the same as the total integrity probability and the continuity probability that are intended to be secured by the system (Equation 14), the VPL is minimized to be optimized by making the VPLs of all the failure modes the same (Equation 13).

$$\text{Minimize } \max_m [k_{HMI,m}\psi_m + k_{cont,m}\theta_m + \beta_m] \qquad \text{[Equation 13]}$$

$$\text{subject to } \sum_{m=0}^{N_{mod}-1} 2a_m Q(-k_{cont,m}) = \qquad \text{[Equation 14]}$$
$$P_{totalcont} \text{ and } \sum_{i=m}^{N_{mod}-1} 2P_{ap,m}Q(-k_{HMI,m}) = PHMI_{total}$$

In the above equation, P$_{total,cont}$ and PHMI$_{total}$ are total continuity and integrity risk probabilities of an LAD-GNSS system, and N$_{mod}$ is the number of failure modes. a$_m$ for the H0 mode is 0, and as for the other failure modes are 1.

Hereinafter, the present invention, which has been described until now, will be briefly summarized with reference to FIGS. 7 and 8.

As described above, FIG. 7 is a block diagram illustrating the internal configurations of the ground station system 100 and the UAV mounted apparatus 200 that constitute an optimal protection level calculating system for a local-area differential GNSS for UAV navigation. FIG. 8 is a sequence diagram of a method for calculating an optimal protection level for a local-area differential GNSS for UAV navigation that is realized through the ground station system 100 and the UAV mounted apparatus 200.

Referring to FIG. 7, the ground station system 100 includes a GNSS data receiving unit 110 configured to receive global navigation satellite system (GNSS) data from a satellite, a failure monitoring unit 120 configured to monitor various failures (a failure of the satellite, a failure of a signal, a failure of a receiver of a ground station system, and the like) based on the received signal and remove the failed signal or receiver, an integrity parameter calculating unit 130 configured to calculate various pieces of integrity information, which have been described above, by using the received GNSS data, and a message broadcasting unit 140 configured to broadcast a message including the calculated integrity information to the UAVs.

Further, the UAV mounted apparatus 200 includes a GNSS data receiving unit 210 configured to receive GNSS data from a satellite, a failure monitoring unit 220 configured to monitor various failures (a failure of a satellite, a failure of a signal, a failure of a receiver of the UAV mounted apparatus) based on the received signal and remove the failed signal or receiver, a ground station system data receiving unit 230 configured to receive data including integrity information and the like that are broadcast by the ground station system 100, a protection level calculating unit 240 configured to calculate the protection levels of the failure modes, which have been described above, a protection level calculating/optimizing unit 250 configured to calculate an optimized protection level from the protection levels calculated for the failure modes, and a database 260 configured to store various pieces of data related to the calculation of the protection level. Further, although not illustrated, a control unit configured to perform a series of processes for calculating an optimal protection level for a local-area differential GNSS for UAV navigation by controlling the modules of the UAV mounted apparatus.

A process for calculating an optimal protection level, that is, an optimal VPL will be described as follows.

Referring to FIG. 8, the ground station system 100 calculates integrity information for calculating VPLs in failure modes (S201). That is, the integrity information is information for calculating $\Psi m$, $\theta m$, and $\beta m$ in the general equation of the VPL of Equation 12.

In the detailed embodiment, $\beta_m{}^i$ (see Equations 3, 3-2, and 8) is calculated as information for calculating $VPL_{H1}$, $\sigma_{t_e}$ (see Equations 4, 4-1, and 9) is calculated as information for calculating $VPL_e$, $\sigma_{t_{Ed}}$ (see Equations 5 and 10) is calculated as information for calculating $VPL_{EA}$, and $MDE_{CCD}$ (see Equations 6 and 11) is calculated as information for calculating $VPL_{CCD}(i)$ (S201). Thereafter, the calculated integrity information is broadcast to an apparatus (hereinafter, referred to as 'UAV mounted apparatus 200') that is mounted to an UAV (S202).

The UAV mounted apparatus 200 receives the integrity information from the ground station system 100 (S202), and fetches the following information stored in the database 260 (see FIG. 7) in advance (S203). In the detailed embodiment, $P_{ap,H1}$ (see Equations 3, 3-1, and 8) is calculated as information for calculating $VPL_{H1}$, $P_{ap,e}$ (see Equations 4, 4-2, and 9) is calculated as information for calculating $VPL_e$, $P_{ap,EA,\tau,T}$ (see Equations 5, 5-2, and 10) is calculated as information for calculating $VPL_{EA(i)}$, and $P_{ap,CCD}$ (see Equations 6, 6-2, and 11) is calculated as information for calculating $VPL_{CCD(i)}$ (S203).

Thereafter, the UAV mounted apparatus 100 calculates information for calculating a VPL as follows. That is, $S_{vert,i,oi}$ (see Equations 2 and 7) is calculated as information for calculating $VPL_{H0}$, $S_{vert,ioH1,i}$ (see Equations 3 and 8) is calculated as information for calculating $VPL_{H1(j)}$, $S_{vert,i,oi,x,Ri}$ (see Equations 4, 4-1, and 9) is calculated as information for calculating $VPL_e$, $S_{vert,i,oi}$ (see Equations 5 and 10) is calculated as information for calculating $VPL_{EA}$, and $S_{vert,oi}$ (see Equations 6 and 11) is calculated as information for calculating $VPL_{CCD(i)}$ (S204).

Thereafter, the UAV mounted apparatus 200 fetches a total continuity risk probability $P_{total,cont}$ and a total integrity risk probability $PHMI_{total}$ from the database 260 (see FIG. 7) (S205), and calculates final parameters $\Psi m$, $\theta m$, and $\beta m$ by putting the integrity information received from the ground station system 100, the information fetched from the database 260, and the information calculated from the GNSS data (S206). Thereafter, an optimal VPL is calculated from this (S207).

FIG. 9 is a flowchart of a simulation for calculating a pseudo-range error of an ionosphere of a GBAS.

A description of a geometry screening technique of an existing GBAS is as follows. A maximum pseudo-range error is calculated through a preliminary risk simulation of an ionosphere, and a vertical position error due to ionospheric delay is calculated by using the calculated maximum pseudo-range error. A description thereof will be described in sequence in the following.

First, the pseudo-range error generated due to the ionospheric gradient is calculated through an illustration such as the above picture. The GBAS uses a carrier smoothed code (CSC) measurement value that passes through a smoothing process to alleviate signal noise. A difference between the measurement values, to which the same time constant of 100 second is applied in the aircraft and the ground station, becomes an error, and it is identified whether the error is detected by the CCD monitor. In the simulation of the scenario, simulations of all cases that may occur through the parameters are carried out while the magnitude, the width, the movement speed, and the initial location of the gradient, the maximum values for $\Delta vs$ are searched for.

Next, in order to calculate a vertical position error due to ionospheric delay, a situation in which two satellites are influenced by the ionospheric front at the same time is assumed as a worst ionosphere abnormality phenomenon scenario. Then, the vertical position error due to ionospheric delay is expressed as in the following equation.

$$IEV_{i,j} = |R(\Delta v_i)s_{v,i} + R(\Delta v_j)s_{v,j}|$$

$IEV_{i,j}$ refers to a vertical position error due to ionospheric delay of a i, j-th satellite, and R refers to a maximum pseudo-range error that may be generated by ionospheric gradient. This uses table values that is determined through a simulation in advance, and is expressed by a function for $\Delta v$ that is a difference between the gradient of the ionosphere and the movement speed of the satellite. $S_{v,i}$ is a vertical satellite geometric coefficient of an i-th satellite, and is a constant by which a pseudo-range error area is transformed to a location error area.

The vertical satellite geometric coefficient is as follow.

If the location of the satellite is represented in an NED (North, East, Down) coordinate, in which the location of the receiver is a reference point, and an elevation El and an azimuth angle Az of the satellite that is geometric information. A matrix G (size: N by 4) is calculated in the following equation by using the elevations and the azimuth angles of the obtained N satellites. The matrix G is a matrix that is essentially calculated in the process of calculating a GPS location solution in a matrix including the distribution information of the satellite.

$$G = \begin{bmatrix} -\cos El_1 \cos Az_1 & -\cos El_1 \cos Az_1 & -\sin El_1 & 1 \\ -\cos El_2 \cos Az_2 & -\cos El_2 \cos Az_2 & -\sin El_2 & 1 \\ & \vdots & & \\ -\cos El_N \cos Az_N & -\cos El_N \cos Az_N & -\sin El_N & 1 \end{bmatrix}$$

The matrix W (size: N by N) is a weight value matrix, and includes variant values of pseudo-range error probability distributions of satellites.

$$W = \begin{bmatrix} \sigma_1^2 & \cdots & 0 \\ \vdots & \ddots & \vdots \\ 0 & \cdots & \sigma_N^2 \end{bmatrix}$$

The vertical satellite geometric coefficient refers to an element corresponding to a vertical component of the following matrix S obtained by combining the matrix G and the matrix W with a least square method.

$$S(G^T W G)^{-1} G^T W \qquad \text{[Equation 15]}$$

The largest value of the induced IEVs of all pairs of satellites that may be obtained from specific satellite geometry will be defined as MIEV. When N satellites are observed by a GBAS ground system at a specific time point, the subset geometry of the satellites is generated through a combination of N to (N−2) satellites as in the following equation. One MIEV is calculated in consideration of all satellite pairs for the subset geometry.

$$\sum_{k=N-2}^{N} \binom{N}{k}$$

In this way, the location error MIEV induced from the worst ionosphere abnormality phenomenon scenario does not have to exceed a TEL. The TEL is induced from an obstacle clearance surface (OCS) for a precise approach of the aircraft, and as an example, is calculated to 28.79 m at the determined height of 200 ft. When the MIEV value exceeds a TEL value, the GBAS determines that there is a potential integrity risk.

The GBAS expends the vertical protection level (VPL) to alleviate the potential integrity risk. The GBAS ground apparatus determines the protection level through the following process for all the subset satellite geometry at a specific time point and at a specific location.

$$VPL_{H_0} = K_{ffmd} \sqrt{\sum_{i=1}^{N} s_{v,i}^2 \sigma_i^2}$$

$K_{ffmd}$ refers to a coefficient of a non-detection probability under the assumption that there is no failure of a measurement value, and $\sigma_i$ refers to a standard deviation of an error distribution for a satellite i. The $VPL_{H_o}$ derived through the above values is calculated for the subsets of all the satellite geometry, and is compared with a vertical alert limit established in a requirement condition in advance. The use of the subset geometry that exceeds the vertical alert limit is not approved by the GBAS ground system.

$$\sigma_i^2 = \sigma_{pr\_gnd,i}^2 + \sigma_{tropo,i}^2 + \sigma_{pr\_air,i}^2 + \sigma_{iono,i}^2$$

The statistical values used in the calculation of the vertical protection level are four error elements as in the above equation, and includes a ground system error term, an error term for a residual error related to a convection layer, an error term for the satellite with respect to the measurement value of the receiver in the aircraft, and an error term for a residual error caused by a spatial de-correlation under a static state of the ionosphere, in sequence.

The GBAS ground system expands all the vertical protection levels by multiplying by an existing σvig by an expansion coefficient for the subset geometry determined to be a potential integrity risk in a worst ionosphere abnormality phenomenon, that is, all subset geometry in which the MIEV is larger than the TEL value, in order to make a value that is larger than a vertical alert limit. Ivig that makes the vertical protection level larger than the vertical alert limit value is determined and the expanded integrity parameter is broadcast. The aircraft prohibits use of the subset geometry corresponding to the above condition (MIEV>TEL) by forcing the vertical protection level calculated by using the expansion to exceed the vertical alert limit. Through the method, the potential integrity risk generated in the worst ionosphere abnormality phenomenon scenario is alleviated.

FIG. 10 is a view illustrating a situation to which a pseudo-range error calculation simulation parameter of an ionosphere of a local-area differential GNSS of the present invention is applied.

Hereinafter, the LAD-GNSS will be used for a term for the UAV navigation system using the GNSS, that is, a ground station system and a UAV mounted system.

Three changes are mainly applied as follows such that the complex geometry screening technique of the above-described existing GBAS is more suitable for the UAV navigation system.

1. Change of System Architecture from Ground Apparatus to Mounted Navigation Apparatus Because the mounted navigation apparatus (user) knows a combination of satellite geometry used for measurement of location thereof, a calculation process of a combination of many satellites is not necessary.

2. Change of Worst Ionosphere Abnormality phenomenon Scenario

Unlike the scenario in an existing GBAS I which two satellites are influenced by the ionospheric gradient at the same time, it is defined that only one satellite is influenced in the LAD-GNSS.

3. Direct Comparison of MIEV Other than Expansion of Vertical Protection Level and Alert Limit Value Unlike the GBAS that has determined the use of the subsets of specific satellite geometry through expansion of the vertical protection level, a navigation for an UAV may be controlled more promptly by directly comparing the MIE value with the alert limit value in the LAD-GNSS that is performed for only one satellite geometry.

Hereinafter, a mounted satellite geometry screening algorithm of a simplified LAD-GNSS will be described. First, a maximum pseudo-range error that is not detected by the monitor is calculated based on a simulation in advance as in the GBAS.

FIG. 10 is a picture depicting parameters of a pseudo-range error simulation. Unlike the simulation in the GBAS that does not consider the directionality, the orientation angle of the ground station, the movement direction of the ionospheric front, and the movement direction of the UAV are additionally included in the simulation parameters in the LAD-GNSs in which the DSIGMA that is influenced by the directionality.

FIG. 11 is a table representing an investigation range for error calculation simulation parameters of pseudo-range errors of an ionosphere. FIG. 12 is an embodiment of maximum pseudo-range error results for scenarios according to an UAV operating environment.

FIG. 11 represents minimum values, maximum values, and intervals that are investigation ranges that are set for the parameters. A parameter ΔW that is not represented in FIG. 10 refers to a relative distance between the UAV located at the final time of the simulation and the ionospheric front, and β refers to a difference value of the movement direction and the ionospheric front. The exemplary result of the maximum pseudo-range errors for two scenarios for the investigation ranges of the Table of FIG. 11 is as in the table of FIG. 12.

FIG. 13 is a flowchart of, the satellite geometry screening apparatus 300 mounted on the UAV of the LAD-GLASS, performing a satellite geometry screening method of the present invention. FIG. 14 is a view illustrating a configuration of the UAV mounted satellite geometry screening apparatus 300.

Hereinafter, a process of calculating a vertical position error due to ionospheric delay will be described with reference to FIGS. 13 and 14.

The pseudo-range error refers to an error that is still left by an abnormality of an ionosphere or the like even though the correction information received from the ground station is applied to the location information obtained by the UAV mounted navigation apparatus.

First, in the UAV mounted satellite geometry screening apparatus 300, a control unit 301 performs a series of processes related to the satellite geometry screening by controlling the modules described in the following. The satellite geometry screening refers to determining whether the current location information of the UAV calculated by the information from the navigation system, such as the UAV mounted navigation apparatus or the ground station, is proper.

Parameters are collected by a maximum pseudo-range error calculation parameter collecting unit 302 (S510). As described above with reference to FIG. 10, the parameters may include the orientation angle of the ground station, the movement direction of the ionospheric front, and the movement direction of the UAV, which are parameters that are influenced by the directionality. In addition, those that may become parameters are as described with reference to FIGS. 10 and 11.

From this, a maximum pseudo-range error calculating unit 303 calculates a maximum pseudo-range error (S520). Although the maximum pseudo-range error may be obtained through the calculation of the parameters in real time (S520), but may be obtained by searching for the maximum pseudo-range errors corresponding to the collected parameters from the database 306 with the database 306 including a parameter table of FIG. 11 (S520).

The LAD-GNSS assumes a situation in which one satellite is influenced by the ionospheric front as a worst ionosphere abnormality phenomenon scenario. Then, the vertical position error due to ionospheric delay is expressed as in Equation 15, and accordingly, the ionosphere location error calculating unit 504 calculates a vertical position error due to ionospheric delay (S530).

$$IEV_i = |R \times s_{v,i}|$$ [Equation 16]

$IEV_i$ refers to a vertical position error due to ionospheric delay of a i-th satellite, and R refers to a maximum pseudo-range error that may be generated by the ionospheric gradient. This uses table values that are obtained through a simulation in advance. $S_{v,i}$ is a vertical satellite geometric coefficient of an i-th satellite, and is a constant by which a pseudo-range error area is transformed to a location error area. It is as described above that this is an element corresponding to a vertical component of S of Equation 15.

Because the UAV mounted navigation apparatus (user) of the LAD-GNSS knows its satellite geometry, it is unnecessary to obtain a vertical position error due to ionospheric delay for a subset of the satellite geometry as in the GBAS. A vertical position error due to ionospheric delay calculating unit 304 selects the largest value (hereinafter, referred to as 'MIEV') of the induced IEV of all the satellites that may be obtained from the satellite geometry (S540).

$$MIEV = \max |IEV_i|$$

When N satellites are observed from the GBAS ground system at a specific time point, the MIEV is determined as the largest value of the N IEVs. A navigation system availability determining unit 305 determines availability of the navigation system (for example, an UAV mounted navigation apparatus or the like) that is being currently operated in real time through direction comparison of the MIEV value calculated in real time and a position error limit (hereinafter, referred to as 'alert limit') required from the operated area (S550) to secure the safety of the user from the threat of the ionosphere by stopping use of the corresponding navigation system when the alert limit is exceeded.

FIG. 15 is a view illustrating comparison of a maximum pseudo-range error calculation simulation result (a) in the GBAS and a maximum pseudo-range error calculation simulation result (b) of the LAD-GNSS of the present invention.

In FIG. 15A, the result of the maximum error calculation simulation performed by the existing GBAS is expressed as a relative speed as in the following picture. The blue line indicates a maximum value of the maximum pseudo-range error calculated through an actual simulation, and the red line is an equation that is linearly modeled to facilitate calculation. A value of the red line is used in an actual operation. It becomes more difficult to detect the ionospheric front by the CCD monitor operated in the GBAS ground station as the relative speed becomes closer to 0, the maximum pseudo-range error generally has a maximum value in the vicinity of 0.

In FIG. 15B, meanwhile, the LAD-GNSS of the present invention that is a simplified system for the UAV assumes that only one satellite is influenced by the ionospheric front. Although a situation in which two satellites are influenced at the same time, the probability of which is mere, was selected as the worst scenario because the existing GBAS is a system that supports the navigation of the manned aerial vehicle on which a person is on, the UAV considers only a situation in which only one satellite is influenced to reduce a danger of injuries and increase the availability and utility of the system as compared with the manned aerial vehicle.

Then, because there is no ground for having to determine the movement direction of the ionospheric front as in the GBAS in the scenario in which one satellite is influenced, the vertical position errors due to ionospheric delay are calculated for all the directions. The relative speed will have different values according to the movement direction of the ionospheric front.

In Equation 16, in the vertical position error due to ionospheric delay calculation equation for the i-th satellite, sv,i is a parameter that is determined according to distribution of all currently received satellites regardless of the movement direction of the ionospheric front. Accordingly, a process of obtaining maximum vertical position error due to ionospheric delay for all the movement directions is the same as the process of searching for a maximum value of the maximum pseudo-range error. That is, a situation in which the ionospheric front moves such that a relative speed when the maximum pseudo-range error has a maximum value is obtained becomes the worst scenario. For this reason, the LAD-GNSS uses the maximum pseudo-range error as a constant model.

The following picture represents a result graph of the maximum pseudo-range error simulation calculated by the LAD-GNSS. The colored lines are maximum pseudo-range errors calculated according to the size (g) of the ionospheric front, and the black line represents a maximum pseudo-range error model of a constant form calculated for all the potential ionosphere threat range. As in the GBAS, it becomes difficult for the CCD monitor operated by the ground station and the DSIGMA operated by the mounted apparatus to detect the ionospheric front as the relative speed becomes closer to 0 so that the maximum pseudo-range error becomes larger.

According to the present invention, the ground module receives a GNSS navigation signal, calculates GNSS navigation error information, and generates correction information, and monitors a failure through a simplified failure monitoring algorithm. The mounted module provides a system and a method for receiving a message that is broadcast by the ground module, and calculating precise and safe navigation information of an UAV by applying the message.

The present invention broadcasts integrity information for calculating protection levels of the system failure modes and calculates an optimal protection level obtained by removing the conservativeness from the UAV mounted apparatus based on the integrity information by the ground station system.

The present invention designs a system having calculation efficiency and flexibility by applying a satellite geometry screening technique that has been operated by the ground apparatus to the UAV mounted navigation apparatus, and allows a more precise pseudo-range error simulation by adding a DSIGMA that considers directionality in a process of calculating a maximum pseudo-range error calculating process by the LAD-GNSS.

Further, the present invention allows prompt screening of satellite geometry without a need for a calculation process for many satellite combinations because the mounted navigation apparatus (user) knows the combination of the satellite geometry used for measurement of a location thereof by applying the satellite geometry screening technique to the UAV mounted navigation apparatus, and unlike the GBAS that has determine usability of the subsets of specific satellite geometry through expansion of a vertical protection level, allows a prompt navigation control of the UAV by determining an availability by directly comparing an MIEV value with an alert limit value in the LAD-GNSS performed only for one satellite geometry.

What is claimed is:

1. A method of generating navigation information for navigation of an unmanned aerial vehicle (UAV) while communicating with a ground station system, by an UAV mounted apparatus, in which a local-area differential GNSS for UAV navigation is realized, the method comprising:
    (a) receiving GNSS data from a satellite;
    (b) monitoring a failure based on a received signal to remove a signal or a receiver that failed;
    (c) receiving data including correction information and integrity information that are broadcast by the ground station system;
    (d) generating current position information of the UAV by applying the correction information and the integrity information to the received GNSS data; and
    (e) calculating an optimized protection level from protection levels calculated for failure modes received from the ground station system.

2. The method of claim 1, wherein the failure of (b) includes at least one of a failure of a satellite, a delay of a signal, a failure of a signal, and a failure of a receiver of the UAV mounted apparatus.

3. The method of claim 2, wherein the delay of a signal and the failure of a signal due to an ionosphere is calculated in consideration of only satellite geometry that is used by the UAV mounted apparatus.

4. The method of claim 1, wherein the protection level of (e) is a vertical protection level (VPL), and the VPL is obtained from VPL values of a reference receiver fault mode, an ephemeris fault mode, an excessive acceleration (EA) fault mode, and a code carrier divergence (CCD) fault mode.

5. The method of claim 1, wherein in (a), the receiver that receives the GNSS data is the same receiver as the receiver used by the ground station system.

* * * * *